(12) United States Patent
Dunjic et al.

(10) Patent No.: US 11,762,527 B2
(45) Date of Patent: *Sep. 19, 2023

(54) COMPACT GRAPHICAL USER INTERFACE CONTROL

(71) Applicant: The Toronto-Dominion Bank, Toronto (CA)

(72) Inventors: Milos Dunjic, Oakville (CA); Perry Aaron Jones Haldenby, Toronto (CA); Arthur Carroll Chow, Markham (CA); Anthony Haituyen Nguyen, Toronto (CA); Het Anand Patel, Mississauga (CA); Casey Lyn Doyle, Ajax (CA); Yubing Liu, Toronto (CA); John Jong-Suk Lee, Toronto (CA); David Samuel Tax, Toronto (CA); Arun Victor Jagga, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/062,680

(22) Filed: Oct. 5, 2020

(65) Prior Publication Data

US 2021/0019039 A1 Jan. 21, 2021

Related U.S. Application Data

(63) Continuation of application No. 15/726,000, filed on Oct. 5, 2017, now Pat. No. 10,838,576.

(51) Int. Cl.
*G06F 3/04817* (2022.01)
*G06Q 40/12* (2023.01)
(Continued)

(52) U.S. Cl.
CPC ........ *G06F 3/04817* (2013.01); *G06F 3/0486* (2013.01); *G06F 3/04847* (2013.01); *G06F 3/04855* (2013.01); *G06Q 40/125* (2013.12)

(58) Field of Classification Search
CPC ............ G06F 3/04817; G06F 3/04847; G06F 3/04855; G06F 3/0486; G06Q 40/125
See application file for complete search history.

(56) References Cited

U.S. PATENT DOCUMENTS 5,767,852 A * 6/1998 Keller ................. G06F 3/04817
715/835
5,918,217 A 6/1999 Maggioncalda et al.
(Continued)

OTHER PUBLICATIONS

Benke: "How We Use Your Income to Calculate Retirement Spending" originally posted May 29, 2015, retrieved on Oct. 5, 2017 https://www.betterment.com/resources/retirement/planning-ahead/how-we-use-your-income-to-calculate-retirement-spending/.
(Continued)

*Primary Examiner* — Angie Badawi
(74) *Attorney, Agent, or Firm* — Rowand LLP

(57) ABSTRACT

A computer system provides a user interface efficient in its use of screen space allowing values to be provided for attributes. The computer system comprises a processor and a display, an input interface, and a memory coupled to the processor. The memory stores instructions that, when executed by the processor, cause the computer system to: display, within a first region of the display, a plurality of icons corresponding to a plurality of attributes; receive, via the input interface, input corresponding to a drag-and-drop operation wherein a particular one of the plurality of icons is dragged to and then dropped at a drop position within a second region of the display; and assign a value to an attribute corresponding to the particular one of the plurality (Continued)

of icons based on a location of the drop position within the second region. Related methods and computer-readable media are also disclosed.

20 Claims, 11 Drawing Sheets

(51) Int. Cl.
*G06F 3/04855* (2022.01)
*G06F 3/0486* (2013.01)
*G06F 3/04847* (2022.01)

(56) References Cited

U.S. PATENT DOCUMENTS

| | | | |
|---|---|---|---|
| 6,486,896 B1 * | 11/2002 | Ubillos | G06F 3/04855 |
| | | | 715/784 |
| 7,617,138 B1 | 11/2009 | Gladden et al. | |
| 7,774,257 B2 | 8/2010 | Maggioncalda et al. | |
| 7,840,470 B2 | 11/2010 | Robinson | |
| 8,108,299 B1 * | 1/2012 | Waelbroeck | G06Q 40/04 |
| | | | 705/37 |
| 8,332,288 B2 | 12/2012 | Preston et al. | |
| 2006/0089862 A1 | 4/2006 | Anadarao et al. | |
| 2006/0151598 A1 | 7/2006 | Chen et al. | |
| 2008/0033876 A1 * | 2/2008 | Goldman | G06Q 40/02 |
| | | | 705/42 |
| 2010/0179920 A1 | 7/2010 | Snodgrass | |
| 2011/0072373 A1 * | 3/2011 | Yuki | H04N 21/485 |
| | | | 715/764 |
| 2012/0130869 A1 | 5/2012 | Shergill et al. | |
| 2013/0027725 A1 * | 1/2013 | Snyder | H04N 1/00896 |
| | | | 358/1.13 |
| 2013/0041792 A1 | 2/2013 | King et al. | |
| 2013/0069951 A1 * | 3/2013 | Dembo | G06T 11/206 |
| | | | 345/440.2 |
| 2013/0282542 A1 | 10/2013 | White | |
| 2013/0339219 A1 | 12/2013 | Bemheimer et al. | |
| 2014/0012117 A1 * | 1/2014 | Mensinger | A61B 5/742 |
| | | | 600/365 |
| 2014/0032098 A1 * | 1/2014 | Anderson | B60N 2/002 |
| | | | 701/428 |
| 2016/0028357 A1 * | 1/2016 | Okada | G09G 5/363 |
| | | | 381/333 |
| 2016/0048912 A1 | 2/2016 | Davis et al. | |
| 2016/0117773 A1 * | 4/2016 | Lin | G06Q 40/06 |
| | | | 705/36 R |
| 2016/0350792 A1 | 12/2016 | Rajappa et al. | |

OTHER PUBLICATIONS

USPTO, Office Action relating to U.S. Appl. No. 15/726,000 dated May 10, 2019.
USPTO, Final Office Action relating to U.S. Appl. No. 15/726,000 dated Aug. 12, 2019.
USPTO, Advisory Action relating to U.S. Appl. No. 15/726,000 dated Oct. 24, 2019.
USPTO, Office Action relating to U.S. Appl. No. 15/726,000 dated Jun. 2, 2020.
USPTO, Office Action relating to U.S. Appl. No. 15/726,000 dated Jun. 2, 2020, NPL cited by Examiner, NPL 15276000.
CIPO, Examiner's Report relating to CA Application No. 2,981,527 dated Oct. 14, 2021.

* cited by examiner

COMPACT GRAPHICAL USER INTERFACE CONTROL

CROSS-REFERENCE TO RELATED APPLICATIONS

This application is a continuation of U.S. patent application Ser. No. 15/726,000 filed on Oct. 5, 2017, the contents of which are herein incorporated by reference in their entirety.

TECHNICAL FIELD

The present application relates to graphical user interfaces, and, more particularly, to visually compact graphical user interfaces.

BACKGROUND

Graphical user interfaces may allow efficient data entry, review, and, more generally, interaction with computing devices.

Some computing devices may have limited display space. Other computing devices may have ample display space, but the requirements of particular application domains may necessitate maximizing the use of that display space.

In these and other scenarios, it may be necessary to compactly present one or more aspects of a graphical user interface. However, in these and other scenarios, providing various interfaces using conventional user interface controls may consume unacceptably large portions of the display space.

In a particular example, a user interface allowing input of values for a variety of attributes may necessitate providing multiple text input boxes, sliders, or the like. This can take up unacceptably large portions of the display area. This waste of display space may be particularly pronounced when the user may only wish to provide values for a subset of those values.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In one aspect, there is provided a computer system comprising: a processor; a display coupled to the processor; an input interface coupled to the processor; and a memory coupled to the processor, storing instructions that, when executed by the processor, cause the computer system to: display, within a first region of the display, a plurality of icons corresponding to a plurality of attributes; receive, via the input interface, input corresponding to a drag-and-drop operation wherein a particular one of the plurality of icons is dragged to and then dropped at a drop position within a second region of the display; and assign a value to an attribute corresponding to the particular one of the plurality of icons based on a location of the drop position within the second region.

In another aspect, there is provided a computer-implemented method comprising: displaying, within a first region of a display, a plurality of icons corresponding to a plurality of attributes; receiving, via an input interface, input corresponding to a drag-and-drop operation wherein a particular one of the plurality of icons is dragged to and then dropped at a drop position within a second region of the display; and, assigning a value to an attribute corresponding to the particular one of the plurality of icons based on a location of the drop position within the second region.

In another aspect, there is provided a non-transitory computer-readable storage medium storing instructions that when executed by a processor of a computer system cause the computer system to: display, within a first region of a display, a plurality of icons corresponding to a plurality of attributes; receive, via an input interface, input corresponding to a drag-and-drop operation wherein a particular one of the plurality of icons is dragged to and then dropped at a drop position within a second region of the display; and assign a value to an attribute corresponding to the particular one of the plurality of icons based on a location of the drop position within the second region.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
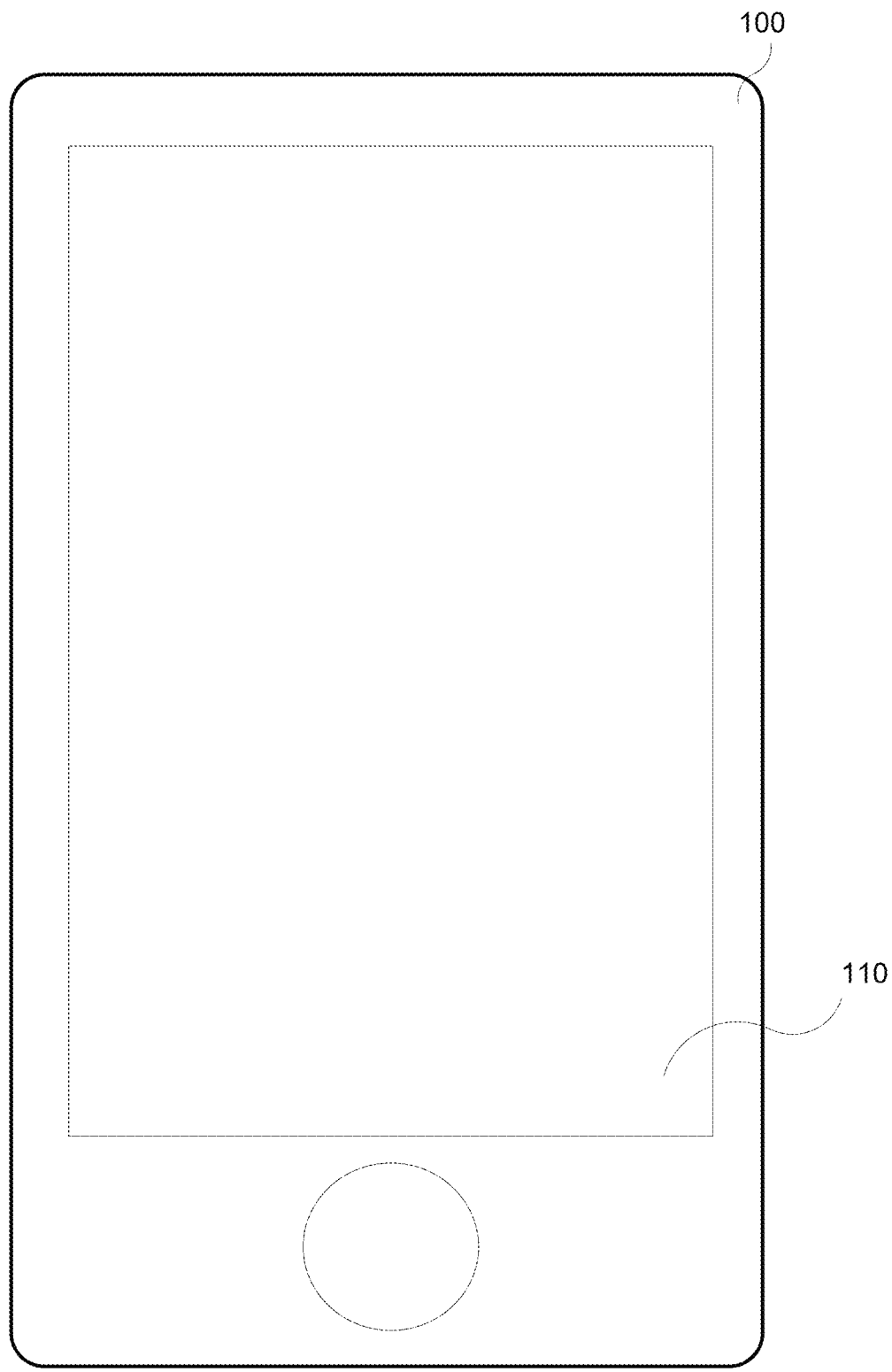
FIG. 1 illustrates an example computing device.

FIG. 1 illustrates an electronic device 100, exemplary of embodiments.

The electronic device 100 is a computing device. The electronic device 100 is equipped with a display 110.

In some embodiments, the electronic device 100 may be a portable electronic device. For example, the electronic device 100 may, as illustrated, be a smartphone. However, the electronic device 100 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), and any other type of computing device that may be configured to store data and software instructions, and execute software instructions to perform operations consistent with disclosed embodiments. The electronic device 100 may be associated with one or more users which may interact with the electronic device 100. For instance, a user may operate the electronic device 100 such as by way of a provided graphical user interface whereby the electronic device may perform one or more operations consistent with the disclosed embodiments.

The electronic device 100 includes a display 110. As discussed above, the electronic device 100 may provide a graphical user interface and the display 110 may display the graphical user interface. The display 110 may be any suitable manner of display such as, for example, a liquid crystal display (LCD), an e-ink/e-paper display, or the like. In some embodiments, the display 110 may be a touchscreen display.

The electronic device 100 may include application software that provides the aforementioned graphical user interface. As further exemplified below, the use of graphical user interfaces may be employed in a variety of applications. Further, as known to skilled person, graphical user interfaces may also be provided by a systems software such as, for example, as an interface to operating systems.

Figure 2:
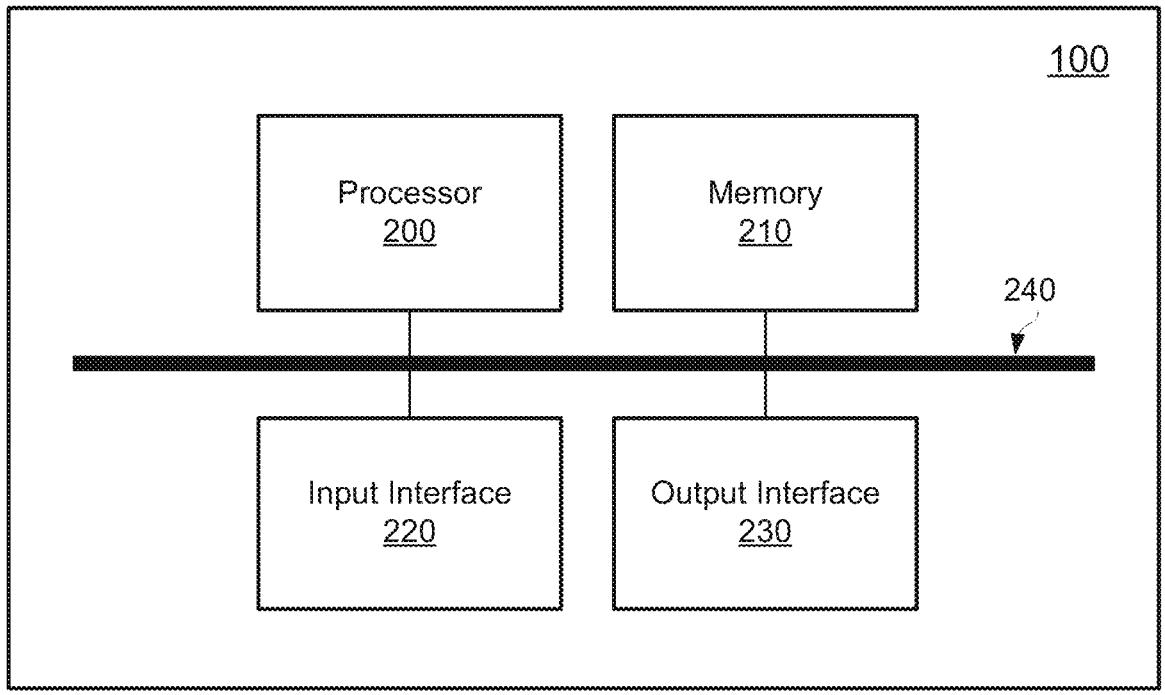
FIG. 2 is a high-level operation diagram of an example computing device.

FIG. 2 is a high-level operation diagram of the electronic device 100. As will be discussed in greater detail below, the electronic device 100 includes software that adapts it to perform a particular function.

The electronic device 100 includes a variety of modules. For example, as illustrated, the electronic device 100 may include a processor 200, a memory 210, an input interface 220, and an output interface 230. As illustrated, the foregoing example modules of the electronic device 100 are in communication over a bus 240.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 100.

The input interface 220 allows the electronic device 100 to receive input signals. signals may, for example, correspond to input received from a user. The input interface 220 may serve to interconnect the electronic device 100 with one or more input devices. Input signals may be received from input devices by the input interface 220. Input devices may, for example, include one or more of a touchscreen input, keyboard, trackball or the like. For example, where the display 110 is a touchscreen, input interface 220 may allow the electronic device 100 to receive and/or may process touch input signals therefrom. In some embodiments, all or a portion of the input interface 220 may be integrated with an input device. For example, the input interface 220 may be integrated with one of the aforementioned example input devices.

The output interface 230 allows the electronic device 100 to provide output signals. Some output signals may, for example allow provision of output to a user. The output interface 230 may serve to interconnect the electronic device 100 with one or more output devices. Output signals may be sent to output devices by output interface 230. Output devices may include, for example the display 110. Additionally or alternatively, output devices may include devices other than screens such as, for example, a speaker, indicator lamps such as for, example, light-emitting diodes (LEDs), and printers. In some embodiments, all or a portion of the output interface 230 may be integrated with an output device. For example, the output interface 230 may be integrated with one of the aforementioned example output devices.

Software comprising instructions is executed by the processor 200 from a computer-readable medium. For example, software may be loaded into random-access memory from persistent storage of the memory 210. Additionally or alternatively, instructions may be executed by the processor 200 directly from read-only memory of the memory 210.

Figure 3:
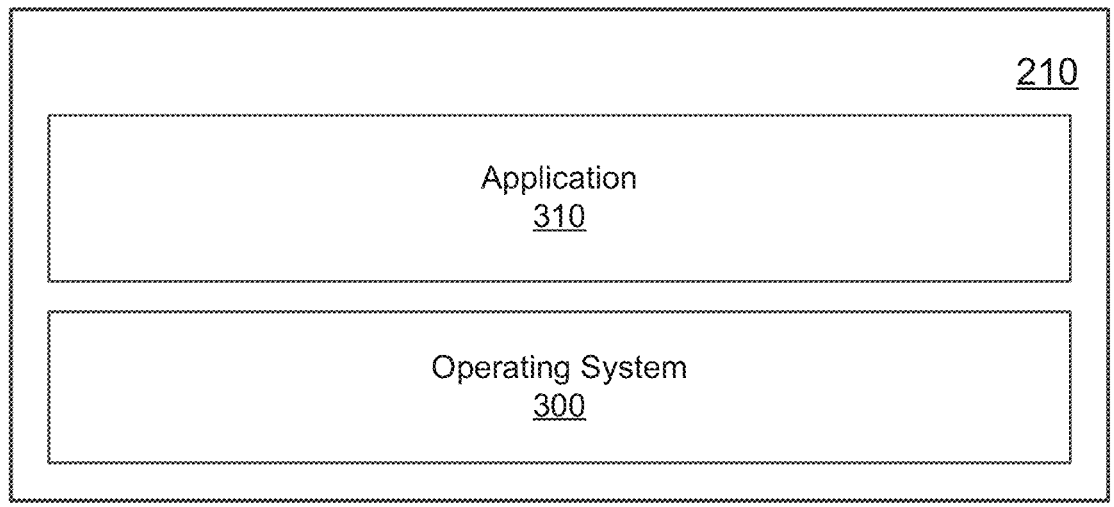
FIG. 3 depicts a simplified software organization exemplary of the example computing device of FIG. 2.

FIG. 3 depicts a simplified organization of software components stored in the memory 210 of the electronic device 100. As illustrated these software components include an operating system 300 and an application 310.

The operating system 300 is software. The operating system 300 allows the application 310 to access the processor 200, the memory 210, the input interface 220, and the output interface 230. The operating system 300 may be, for example, Google™ Android™, Apple iOS™, Microsoft™ Windows™, or the like.

The application 310 adapts the electronic device 100, in combination with the operating system 300, to operate as a device to a particular function. As a part of this, graphical user interfaces may be provided. For example, one or more graphical user interfaces may be displayed on the display 110.

In some applications, provision may be made for allowing input of values in association with various attributes. For example, a graphical user interface may be provided allowing values to be assigned to one or more attributes or variables.

In some embodiments, display space for providing such a graphical user interface may be limited. For example, the display itself may be limited in size. Additionally or alternatively, the space available within the display for providing such a graphical user interface may be limited such as for example, due to the size of a display window or the portion of the display available to the application. In these and other scenarios, the display area consumed by standard user interface controls such as, for example, text boxes or sliders may be prohibitively large.

Additionally or alternatively, it may be that values may only be assigned to a subset of the attributes to which values could be assigned. For example, a user may only desire to assign values to some of the attributes. Accordingly, displaying individual user interface controls for each of the attributes may amount to a waste of display area given that controls may be displayed for attributes to which values are not assigned. Further, displaying unnecessary user interface controls may reduce input accuracy and/or efficiency.

Conventional user interface controls that may be used to input values include sliders—also known as trackbars, text boxes, combo boxes, radio buttons and the like. Such user interface controls typically relate one-to-one to an attribute. In other words, such user interface controls may each permit a single value to be assigned to single associated attribute.

Some variations or combinations of the conventional user interface controls may allow values to be assigned to multiple attributes. However, such graphical user interfaces may only allow a value to be assigned to single one of the multiple attributes. For example, a combo box could allow an attribute to be selected and then a value may be assigned to that attribute using an associated text box. In another example, such conventional graphical user interface may only allow a user to visualize the value assigned to a single attribute at a particular time. For example, the aforementioned combo box may allow selection amongst attributes, but the value (shown in/modified using the text box) may only be displayed for a single selected attribute at a given time. While additional controls could be provided that separately allow viewing of the values assigned to a variety of attributes, this would necessarily require additional screen real estate to be allocated to the graphical user interface. Other conventional graphical user interface elements or combinations thereof overcome one or more of the aforementioned limitations, but may suffer from limitations of their own. For example, a trackbar with multiple sliders may allow values to be assigned to multiple attributes simultaneously, but may suffer from requiring values to be assigned to every attribute rather than only selected ones. Alternatively, various conventional graphical user interface elements or combinations thereof may allow assignment of multiple values but may not present the attributes to which values may be assigned in an intuitive, visual manner.

The following describes a user interface control that, when employed in a graphical user interface displayed on an electronic device by way of software executed by the electronic device, may overcome one or more of the aforementioned limitations of convention user interface controls or combinations thereof. The user interface control may share some characteristics with a conventional slider—namely an optional scale—but allows a user to use a single control to assign values to only attributes the user selects. More broadly, as further described below, the attributes to which values may be assigned and the values assigned thereto may be presented by way of the user interface control in an intuitive, visually pleasing fashion.

Figure 4:
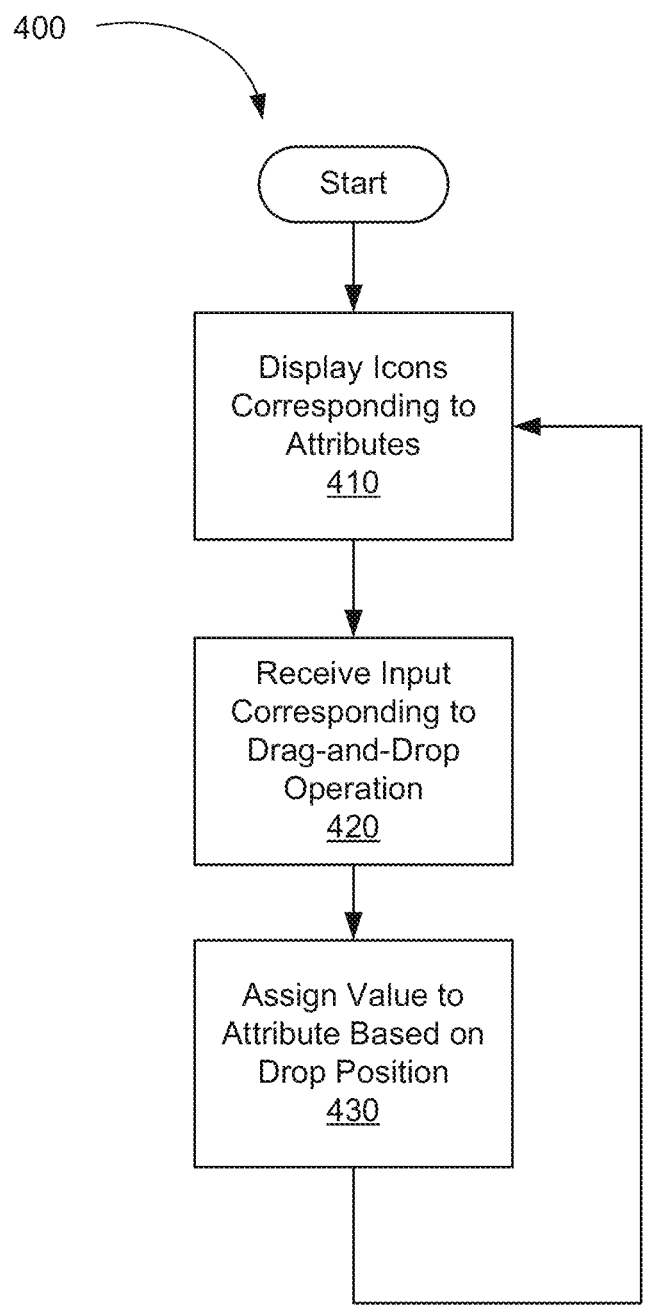
FIG. 4 is a flowchart depicting example operations performed by an application providing a graphical user interface.

The operation of the electronic device 100 in providing a graphical user interface including the user interface control is described with reference to the flowchart of FIG. 4. FIG. 4 illustrates a method 400 that includes operations 410 and onward. A computer-readable medium may store instructions for performing the method 400. The operations 410 and onward may be performed by one or more processors of a computing device, such as for example the processor 200 of the electronic device 100, executing software such as, for example, a suitable instance of the application 310, the software including instructions which cause the method 400 to be performed.

At the operation 410, the processor causes icons corresponding to attributes to be displayed in a first region of the display 110. For example, the icons may be displayed on the display 110 by way of the output interface 230.

Figure 5A:
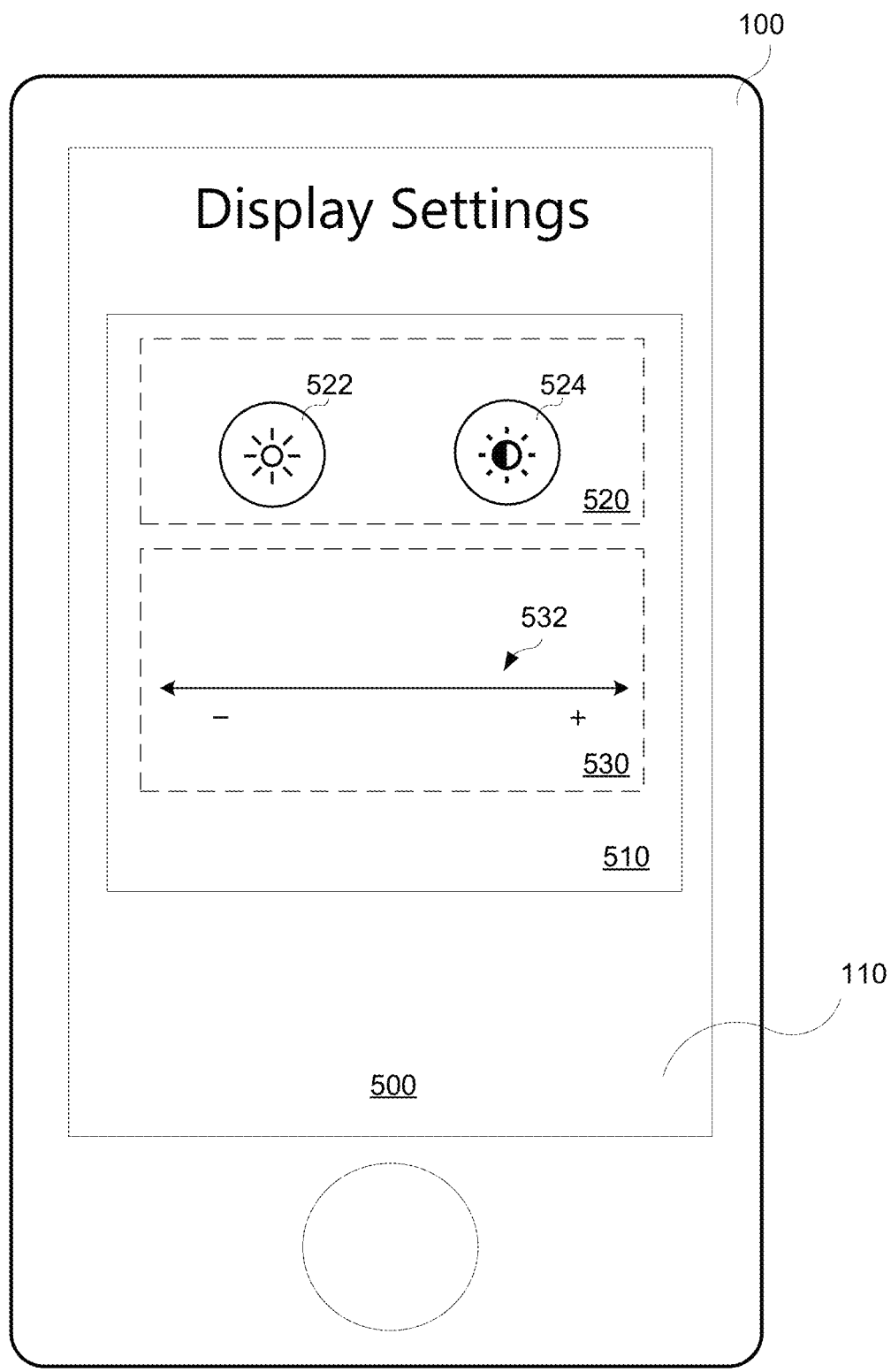
FIGS. 5A-5D illustrate an example application scenario for a user interface control.

FIG. 5A illustrates an example application that includes an instance 510 of the user interface control as a part of an example graphical user interface 500.

The example graphical user interface 500 allows display settings for the electronic device 100 and, in particular, for the display 110 to be modified. In particular, as explained below, the example graphical user interface 500 allows the brightness and contrast of the display 110 to be configured and/or varied.

The instance 510 includes a first region 520. The first region 520 includes icons 522 and 524. As illustrated the icon 522 is labelled with a brightness symbol and the icon 524 is labelled with a contrast symbol.

In the example graphical user interface 500, each of icons 522 and 524 may be displayed at the operation 410.

Returning to FIG. 4, following the operation 410, flow control proceeds to an operation 420.

At the operation 420, the electronic device 100 receives input corresponding to a drag-and-drop operation wherein a particular one of the icons displayed by way of the operation 410 is dragged to and then dropped at a drop position within a second region of the display 110. For example, the electronic device 100 may receive input corresponding to a drag-and-drop operation by way of the input interface 220.

A drag-and-drop operation may involve a user providing input by way of an input interface whereby one of the icons initially displayed by way of the operation 410 is selected and then moved to a new location on the display 110. In particular, the user may select one of the icons and may then maintain that selection until a second location has been indicated. For example, as stated above, the user may drag one of the icons initially displayed by way of the operation 410 to a new location within a second region of the display 110.

In some embodiments, the selection may for example, be indicated by way of an input device action that is maintained throughout the drag-and-drop operation.

As an example, a cursor may be displayed on the display 110 and the location thereof on the display may be updated responsive to movements of an input device such as, for example, a pointing device such as for example, a mouse or a trackball. Such a pointing device may, for example, be coupled to the electronic device by way of the input interface 220. Such a pointing device may also provide one or more means for a user to indicate a selection such as, for example, one or more buttons. Suitable input provided by way of the pointing device may move the cursor to a position on top of or proximate to one of the icons displayed at the operation 410. A selection of that icon may be indicated by way of the pointing device and then, while maintaining the indication of the selection, the cursor may be located to a new position within the second region of the display 110. The selection may then be released, indicating that the aforementioned new position is the target of the drag-and-drop operation—i.e. the drop target.

In another example, where the display 110 is a touchscreen, the user may indicate a selection of an icon by touching the screen with their finger in a position on top of or proximate to one of the icons displayed at the operation 410. The user may then maintain contact with the screen while moving their finger to a new position within the second region of the display 110. The user may then lift their finger off of the display 110 indicating that the aforementioned new position is the drop target. In some embodiments, a suitable stylus may be employed with a touchscreen instead of a finger.

In some embodiments, regardless of the manner of input, the user may be provided with feedback during the drag-and-drop operation. For example, the display 110 may be updated to animate the icon being dragged so that it appears to track the path of the drag-and-drop operation. For example, the icon may be animated on the display 110 so as to follow the path of the cursor or the user's finger.

Turning again to FIG. 5A, the instance 510 includes a second region 530.

Either of the icons 522 and 524 may be dragged from the first region 520 and then dropped in the second region 530. For example, input may be received dragging the icon 522 from the first region 520 to the second region 530. The result of such a drag-and-drop operation is reflected in FIG. 5B. As further discussed below, the drag-and-drop operation may result in the assignment of a value to the brightness attribute associated with the icon 522 based on the location of the drop position in within the second region 530.

Returning to FIG. 4, following the operation 420, control flow proceeds to an operation 430.

At the operation 430, a value is assigned to an attribute based on the drop position of the drag-and-drop operation for which corresponding input was received at operation 420.

In one example, the value may be assigned to the attribute based on the location of the drop position of the drag-and-drop operation. For example, the value may be assigned to the attribute based on the location of the drop position relative to the horizontal or vertical extents of the second region.

In some embodiments, the second region may include one or more visual indications. One or more of these visual indications may reflect how values will be assigned to attributes assigned with icons dragged-and-dropped at particular positions in the second region. In some embodiments, the indications may be displayed prior to receiving input at operation 420. For example, the indications may be displayed as a part of the operation 410.

The aforementioned visual indications may include a scale. In one example, prior to receiving input, instructions executed by the processor 200 may cause the electronic device 100 to display a scale in the second region of the display 110. In a particular example, returning to FIGS. 5A and 5B, the second region 530 may, as illustrated, include a scale 532 defining a range from low (on the left) to high (on the right). The ends of the scale 532 are labelled ("+", "−") indicating that a higher value may be assigned to attributes associated with icons dropped a drop position closer to the right end of the scale 532 while a lower value may be assigned to attributes associated with icons dropped at a drop position closer to the left end of the scale 532.

Figure 5B:
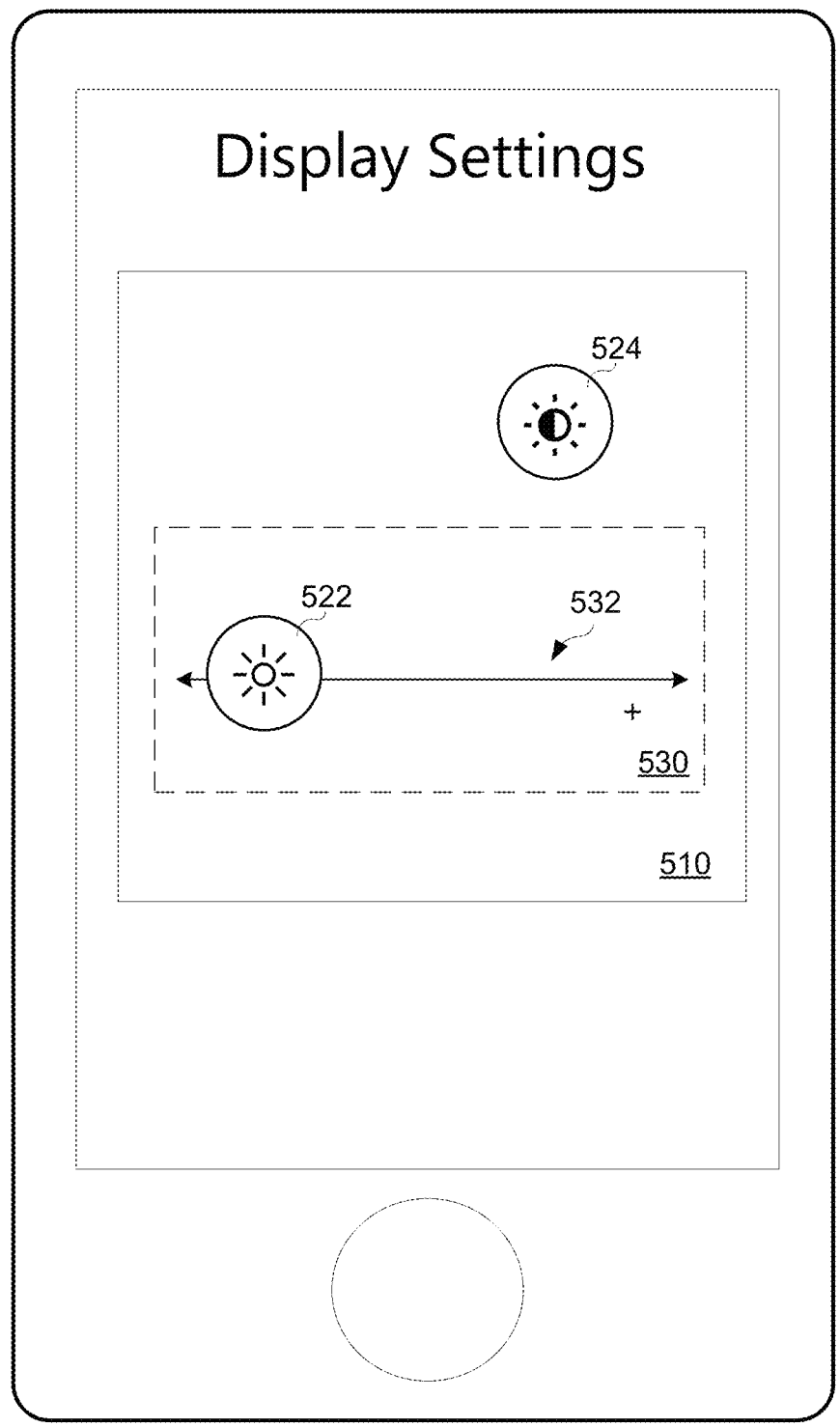

For example, in FIG. 5B, the icon 522 has been dragged to a drop position on the left end of the second region 530. Based on the drop position of the icon 522 relative to the scale 532, a low value may be assigned to display brightness. For example, a drop position at the left of the scale 532 may correspond to a minimal or even zero brightness, while a drop position at the right end of the scale 532 may correspond to high or even one-hundred percent brightness. Values may vary linearly between the ends of the horizontal scale. In another example, it may be that the values assigned are such that values assigned along the scale 532 vary logarithmically, making the scale 532 effectively a logarithmic axis.

The assignment of a value to an attribute associated with an icon may trigger an update to the display 110. For example, upon assigning a value to the attribute associated with icon 522, an update to the display 110 may be triggered. In a particular example, the lowering the brightness of the display 110 may be triggered. In alternate embodiments, an update to another display may be triggered. For example, it may be that the electronic device 100 is employed as a remote control to adjust the brightness of another display.

After the value is assigned, optionally an indication may be displayed in the second region indicating the value assigned to the attribute associated with the dragged icon. In other words, after assigning the value to the attribute, instructions executed by the processor 200 may cause the electronic device 100 to display an indication positioned relative to the scale indicating the value. In one example, the dragged icon may remain in its drop position in the second region. In a particular example, referring to FIG. 5B, the icon 522 may remain at its drop position within the second region 530. In some embodiments, the dragged icon may be moved slightly from its drop position. For example, indications—the dragged icon in the example of FIG. 5B—may be snapped to the scale 532 as illustrated.

In another example, as further discussed below, in some embodiments, more than one indication may be provided in the second region. For example, it may be that more than one of the icons initially displayed at the operation 410 has been dragged to the second region. In such examples, it may be that one or more of the indications associated with dragged icons may be repositioned horizontally or vertically within the second region so as to still reflect the same value but to avoid or limit overlap therebetween. For example, if there is a horizontal scale in the second region 530, one of the indications may be shifted vertically.

Following the operation 430, control flow may return to the operation 420 so that additional input corresponding to one or more further drag-and-drop operations may be received. Alternatively, it may be that control flow terminates or is redirected elsewhere, such as for example, when conditions no longer warrant receiving input via the particular instance of the user interface control.

Further drag-and-drop operations may operate on the icons initially displayed at the operation 410 so as to allow values to be assigned to attributes associated with others of the icons. Additionally or alternatively, at operation 420, input may be received such as by way of via the input interface 220 where an indication displayed at the operation 430 is dragged to and then dropped at a further drop position within the second region. Then, such as when control flow returns to the operation 430, the electronic device 100 may update the value assigned to the attribute associated with that indication based on the location of the further drop position relative to the second region.

Figure 5C:
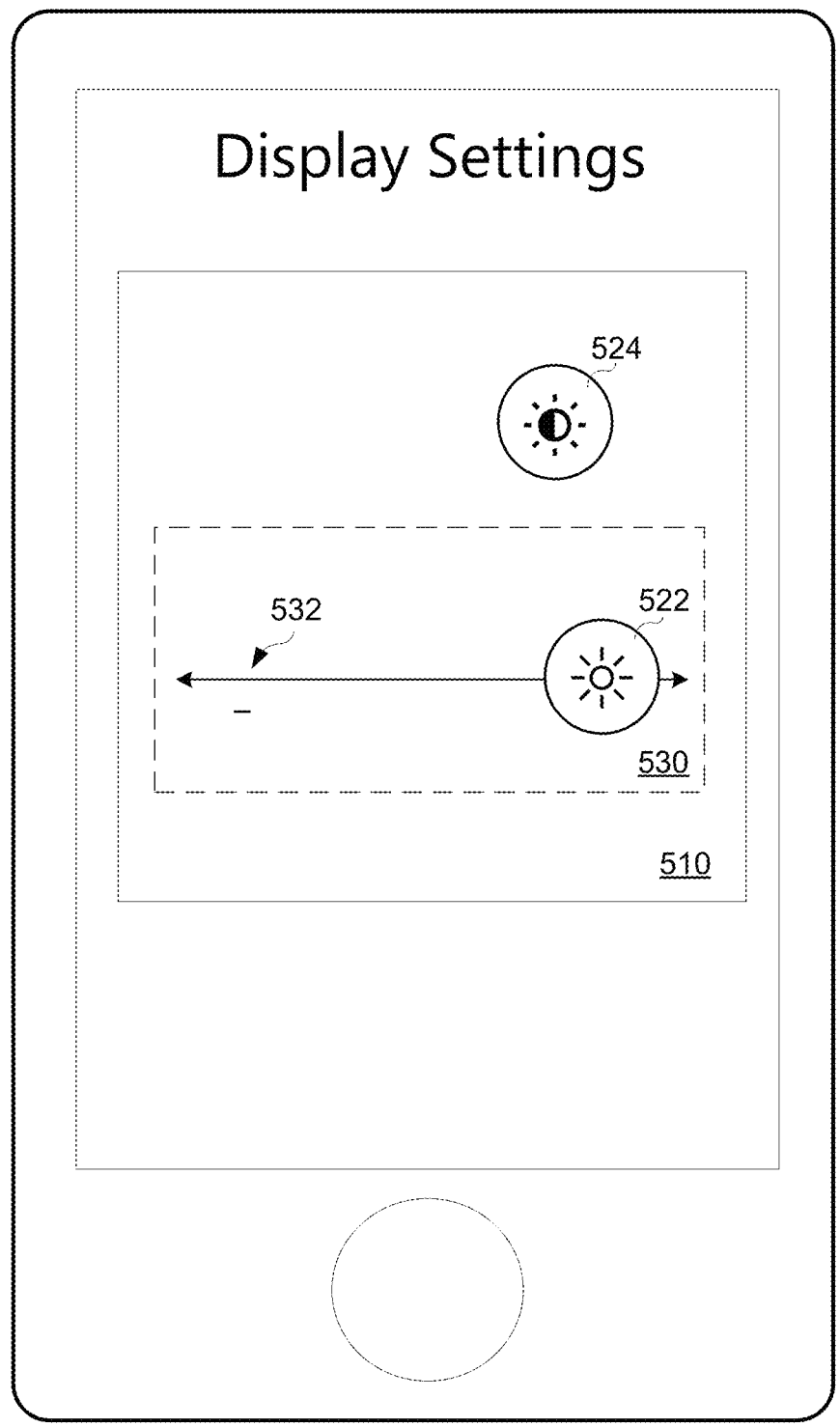

FIG. 5C is an example of a possible result of such a drag-and-drop of a previously displayed indication. As illustrated, the icon 522, which was displayed at a position within the second region 530 as an indication (in FIG. 5B) has been dragged to a new position within the second region 530. As such, the indication has been dragged to a new position relative to the scale 532. Accordingly, the value associated with the attribute associated with the indication may be updated based on the location of the further drop position relative to the scale 532. For example, it may be that a new value is assigned to the display brightness attribute. This may, in turn, have the effect of updating the brightness of a display as set out above.

Figure 5D:
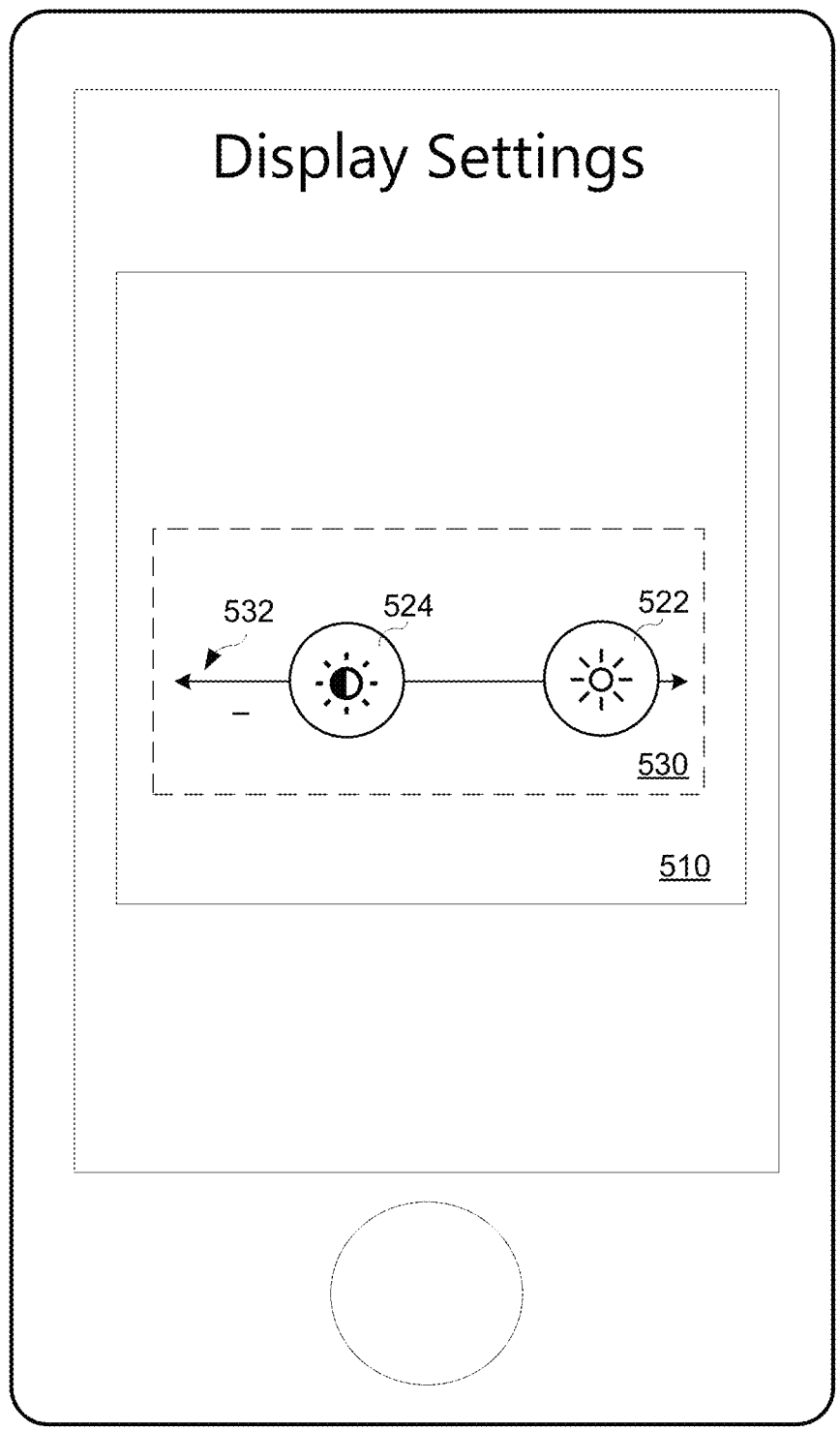

As discussed above, the new control may be used to assign values to attributes associated with more than one icon. For example, FIG. 5D shows how the icon 524 may also be dragged to a position within the second region 530. This may, in turn, allow a value to be assigned to a display contrast attribute. Conveniently, such an assignment of values to attributes associated with more than one icon does not require more than one of second region 530. For example, a single scale can be displayed (e.g. in the second region) and used in assign values to more than one attribute in contrast to conventional trackbar or slider controls which may require one control per attribute. Conveniently, in this way, the user interface control may use less display area than conventional graphical user interface controls.

In some embodiments, a preview of such the effect of assigning a value to an attribute associated with the icon being dragged may be provided during the drag-and-drop operation at operation 420.

For example, once the icon 524 is dragged into the second region 530, the contrast of the display 110 may be varied commensurate with a current cursor or touch position during the drag-and-drop operation. In another example of providing a preview, a preview of the update to the display may be provided during a drag-and-drop operation of the icon 522.

For example, display brightness may be updated during the drag-and-drop operation of the icon 522 (whether on a first drag or on a repositioning of an indication as discussed above) showing the effects of varying display brightness. Conveniently, in this way, a user may view the effects of a change to an attribute in real-time. Allowing a user to view the effects of a change to an attribute in real-time may allow a user to quickly and easily identify a value yielding a desired effect.

The appearance of the instance 510 may be varied.

For example, as illustrated, the instance 510 may be surrounded by a border. Similarly, each of the first region 520 and the second region 530 may be denoted by way of a stippled border, however, in some embodiments, no such a border may not actually be displayed.

The applications of the user interface control described herein is not limited to control of display settings. Another example application of the user interface control is shown in FIGS. 6A-6D where the user interface control is used to allow a user to model the effects of various spending choices on potential net worth or retirement savings.

Figure 6A:
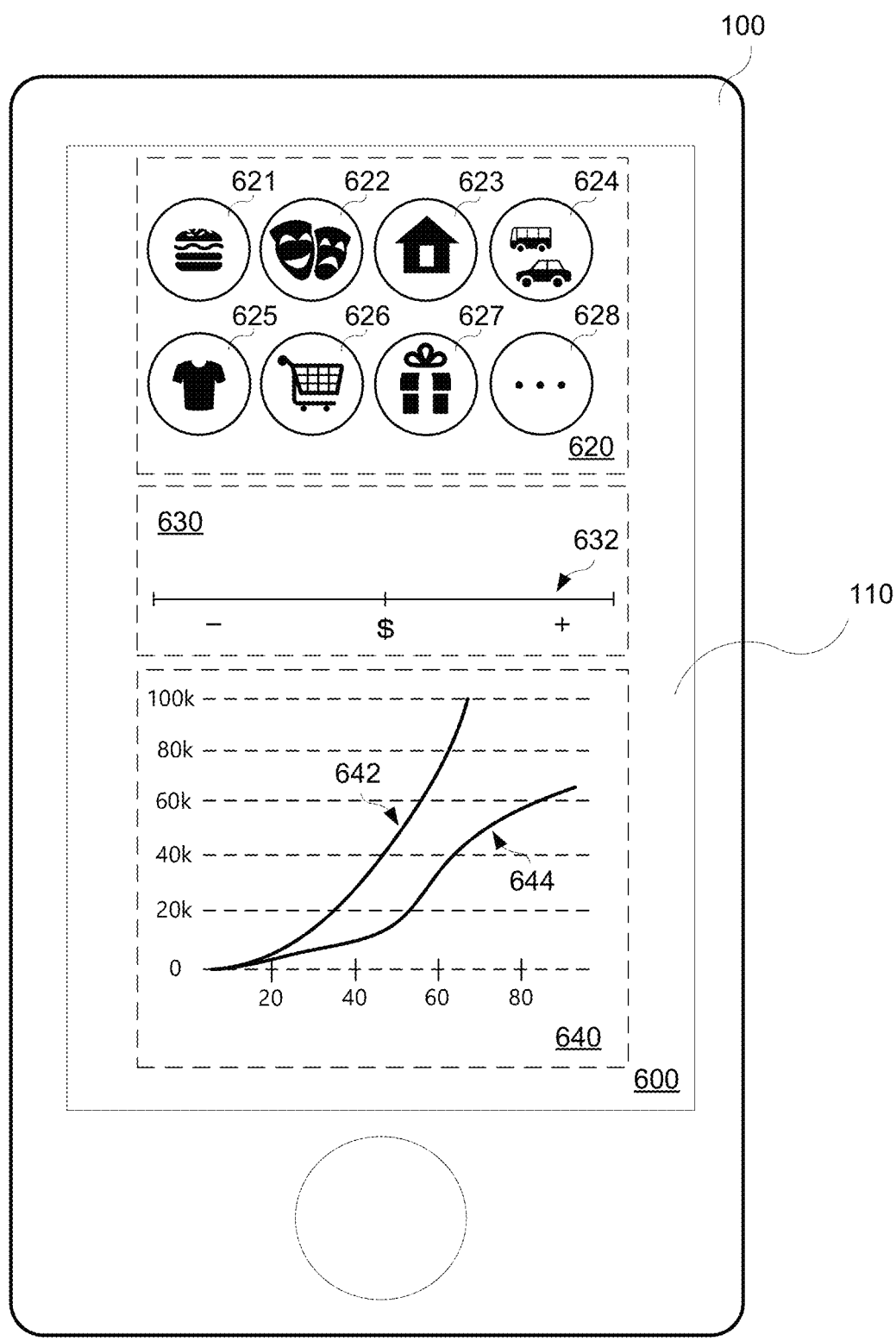
FIGS. 6A-6D illustrate another example application scenario for the user interface control.

Turning to FIG. 6A, the display 110 is showing a user interface 600.

The user interface 600 includes an instance of the user interface control formed of a first region 620 and a second region 630.

As illustrated, the first region 620 includes a variety of icons 621-628. The icons 621-628 may be have associated therewith attributes such as spending in particular categories. In other words, the icons may indicate spending categories and may correspond to attributes representing spending in the spending categories.

For example, the icons 621, 622, 623, 624, 625, 626, 627 may correspond to spending on restaurants, entertainment, household expenses, transportation, clothing, grocery shopping and gifts, respectively. The icon 628 may correspond to some other spending categories. Alternatively, the icon 628 may not be draggable and may instead, open a pop-up menu (not shown) that includes one or more additional icons corresponding to additional spending categories. The additional icons may, when displayed, also be dragged to the second region 630 to assign a value to an attribute associated therewith.

Historical spending of the user may be accessed such as, for example, through access to bank account records, credit card account records, and the like. For example, such records may be stored on and/or retrieved from a suitable server. Historical spending data may be categorized into categories that map to spending categories such as those represented by the icons 621-628. For example, the historical spending data may be automatically categorized by the server.

The historical spending data may determine which spending categories are displayed as compared to those that are hidden under the icon 628. For example, it may be that the icon 628 is used to access less frequently used spending categories or categories that do not contribute significantly to the user's historical spending and a user may select the icon 628 if they wish to assign a value to the attribute of spending in one or more of those categories.

As illustrated, the second region 630 includes a scale 632. As will become apparent, the midpoint of scale 632 corresponds to spending in line with the user's historical average for a particular spending category and the left and right ends correspond, respectively, to increased and reduced spending in the particular spending category. For example, the far extent of the left end of the scale 632 may correspond to spending at a level that is a multiple of the historical spending, such as, for example, twice the historical spending. The far-right end of the scale 632 may then correspond to spending at level below historical spending, allowing for greater savings. In another example, the scale 632 may correspond to the utility associated with particular spending for a user with the values on the scale ranking the satisfaction experienced by the user for spending in a particular category. For example, the left end of the scale 632 may correspond to less satisfaction or a lower utility and the right end of the scale 632 may correspond to greater satisfaction or a higher utility. As such, the utility ranking line defined by the scale 632 may change from love (greatest utility) to indifference (in the middle) to lowest dislike (lowest utility). In any event, values associated with positions therebetween may vary linearly along the scale 632 or may be linear from each end to the midpoint of the scale 632. Alternatively, values may vary non-linearly along the scale 632.

As illustrated the user interface also includes a graph 640. The graph 640 shows time along its x-axis. For example, the x-axis may, as illustrated, vary from current day (0) to 20, 40, 60, 80 etc. years in the future. The graph 640 shows projected overall net worth or, alternatively, retirement savings only, along its y-axis, from $0 dollars upward to $100 k. The illustrated scales are merely by way of example and are no way limiting. In some embodiments, one or both of the axes may use a different scale. Additionally or alternatively, one or both of the axes may employ a non-linear scale.

The graph 640 includes a first line 642 showing an optimal achievable financial benefit over time. For example, the first line 642 may reflect possible retirement savings or overall net worth if the user were to reduce their spending in one or more of the spending categories.

The graph 640 also includes a second line 644 showing a projected financial benefit over time. For example, the second line 644 may reflect possible retirement savings or overall net worth based on the historical spending habits of the user. For example, the projection may assume that the historical spending habits of the user continue unchanged.

The user may drag one or more of the icons 621-628 from the first region 620 to the second region 630 by way of a drag-and-drop operation so as to assign a value to an attribute associated therewith in manners described above. In this way, values may be assigned to the attributes of spending in particular spending categories associated with dragged-and-dropped one of the icons 621-628.

Figure 6B:
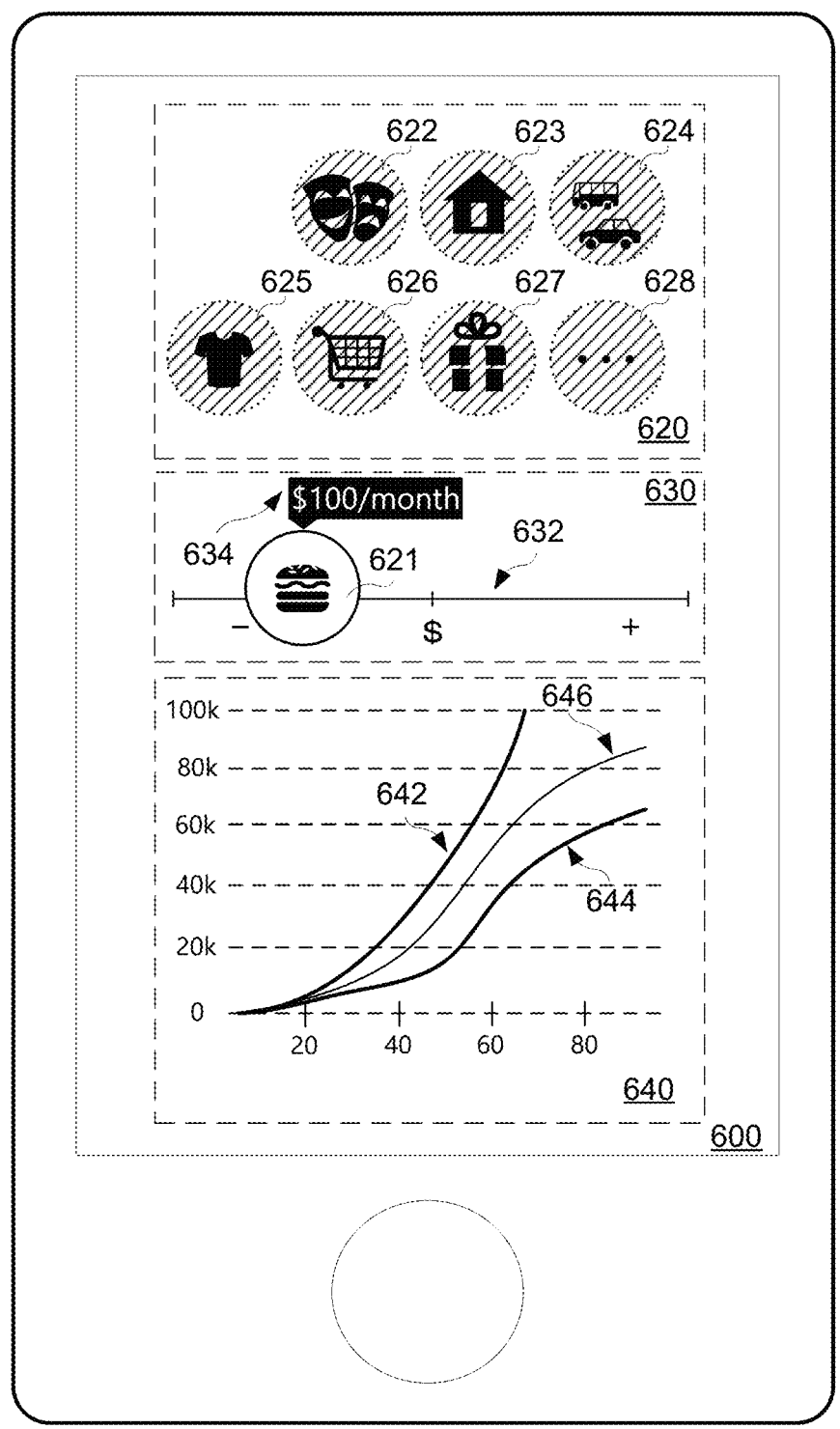

FIG. 6B shows how the user interface 600 may appear during a drag-and-drop affecting the icon 621. As illustrated, the icon 621 is being dragged and is in currently being held in a potential drop position within the second region 630.

During such a drag-and-drop operation, unaffected ones of the icons in the first region 620 may be de-emphasized. For example, as illustrated, icons 622-628 may be greyed out (displayed in black and white), may be shaded to show they are unavailable, or some combination thereof.

Additionally or alternatively, a preview of the value that may be assigned to the attribute associated with the icon being dragged may be provided. For example, as illustrated, during the drag-and-drop operation, a callout 634 may be provided adjacent to the icon 621 showing a representation of the value that would be assigned to the associated spending category if the icon 621 were dropped at its current position. For example, the callout 634 may, as illustrated, include a textual representation of the value that would be assigned to the associated spending category if the icon 621 were dropped at its current position.

In some embodiments, a third line 646 may be displayed on the graph 640 during the drag-and-drop operation. The third line 646 may reflect achievable financial benefit for the user such as for example, achievable net worth or retirement savings value. As illustrated the third line 646 indicates that lower spending on restaurants (as suggested by the current position of icon 621 to the left of the midpoint of the scale 632) would result in an achievable financial benefit better than that projected based on historical spending patterns and depicted by the second line 644.

The third line 646 may be based on the values assigned to the attributes and historical spending habits of the user in one or more of the spending categories. Additionally or alternatively, the third line 646 be based on the value that would be assigned to the associated spending category if an icon being dragged, such as, for example illustrated icon 621, were dropped at its current position. By updating the third line 646 in real-time based on the value that would be assigned to the associated spending as the icon is dragged, a preview of the effects of assigning that value may be shown in real-time. Conveniently, this may allow a user to consider and adjust their decision of the value to assign without the need to perform multiple drag-and-drop operations which may, in turn, improve efficiency and/or productivity. Additionally or alternatively, the third line 646 may automatically adjust as values are assigned to the attributes representing spending in the spending categories.

Figure 6C:
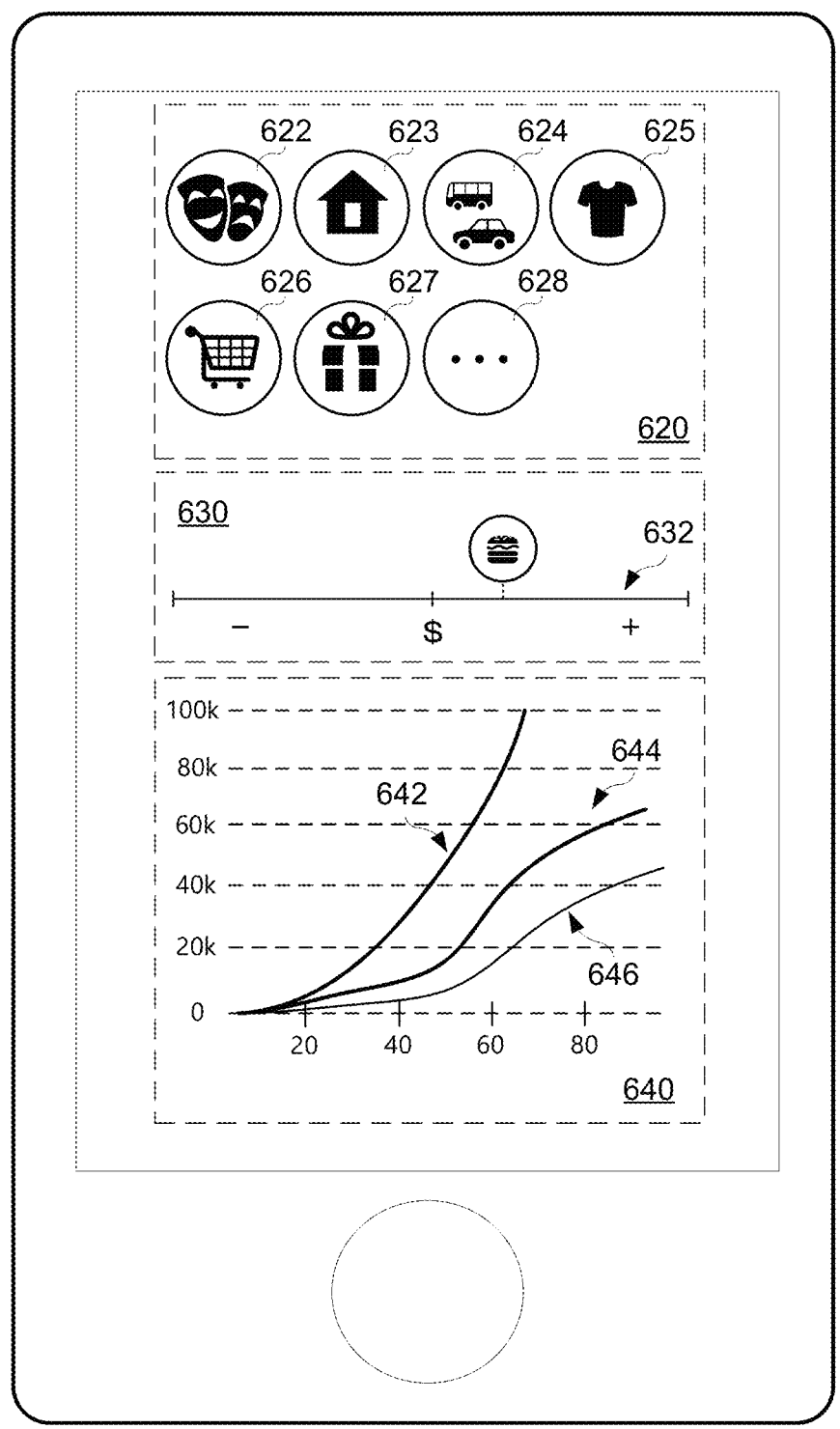

Turning to FIG. 6C, the effects of the drag-and-drop operation depicted in-progress in FIG. 6B are shown.

The icons in the first region 620 may, as illustrated, be rearranged so as to fill the gap left by the dragging of the icon 621 (no longer shown). Alternatively, some or all of the remaining icons could stay in their original positions as was seen with the icon 524 in FIGS. 5B-5C of the example of FIGS. 5A-5D which was not dragged until FIG. 5D.

As shown, an indication 636 may be displayed in a position relative to the scale 632 depicting the value assigned to the attribute associated with the icon 621 (no longer shown). Notably, the indication 636 is smaller than the icon 621 was. Smaller indications may reduce display clutter in the second region 630. Icons may, however, be sized to permit easy drag-and-drop. For example, where the display 110 is a touchscreen it may be desirable for the icons to be no smaller than a typical user's finger. In some embodiments, if a user attempts to drag the indication 636, it may update to the icon 621 during the drag-and-drop operation. A user may be able to more easily drag the larger icon than the smaller indication. Conveniently, if a larger icon is easier for a user to drag then the user may be able to more accurately use the drag-and-drop to assign chosen values.

As shown, the third line 646 now reflects an achievable financial benefit below both the optimal financial benefit (the first line 642) and the projected financial benefit (the second line 644) due to the particular value or associated with the restaurant spending category. In particular, the value of the attribute associated with the restaurant spending category may have been assigned a value above historical spending due to increased spending/a higher utility to restaurant spending as indicated by the position of the indicator 636 relative to the scale 632/the position of the indicator 636 in the second region 630. In some embodiments (not shown), the third line 646 may only be displayed after the value has been assigned to an attribute.

The third line 646 may be displayed in real time following completion of the drag-and-drop operation. Conveniently, displaying, or, if a preview was provided during the drag-and-operation, updating the display of, the third line 646 in real-time may allow a user to consider and adjust their decision of the value quickly allowing the user to perform "what if" scenarios in manners that may result in improved efficiency and/or productivity. Display of the third line 646 in real-time following completion of the drag-and-drop operation may be particularly advantageous in embodiments where a preview is not provided during the drag-and-drop operation as real-time display of the effects of the drag-and-drop operation may allow a user to efficiently refine the value such as to meet desired criteria.

As the user assigns or varies the values assigned to the attributes associated with the various spending categories, the third line 646 may update to reflect changes in the achievable financial benefit.

Figure 6D:
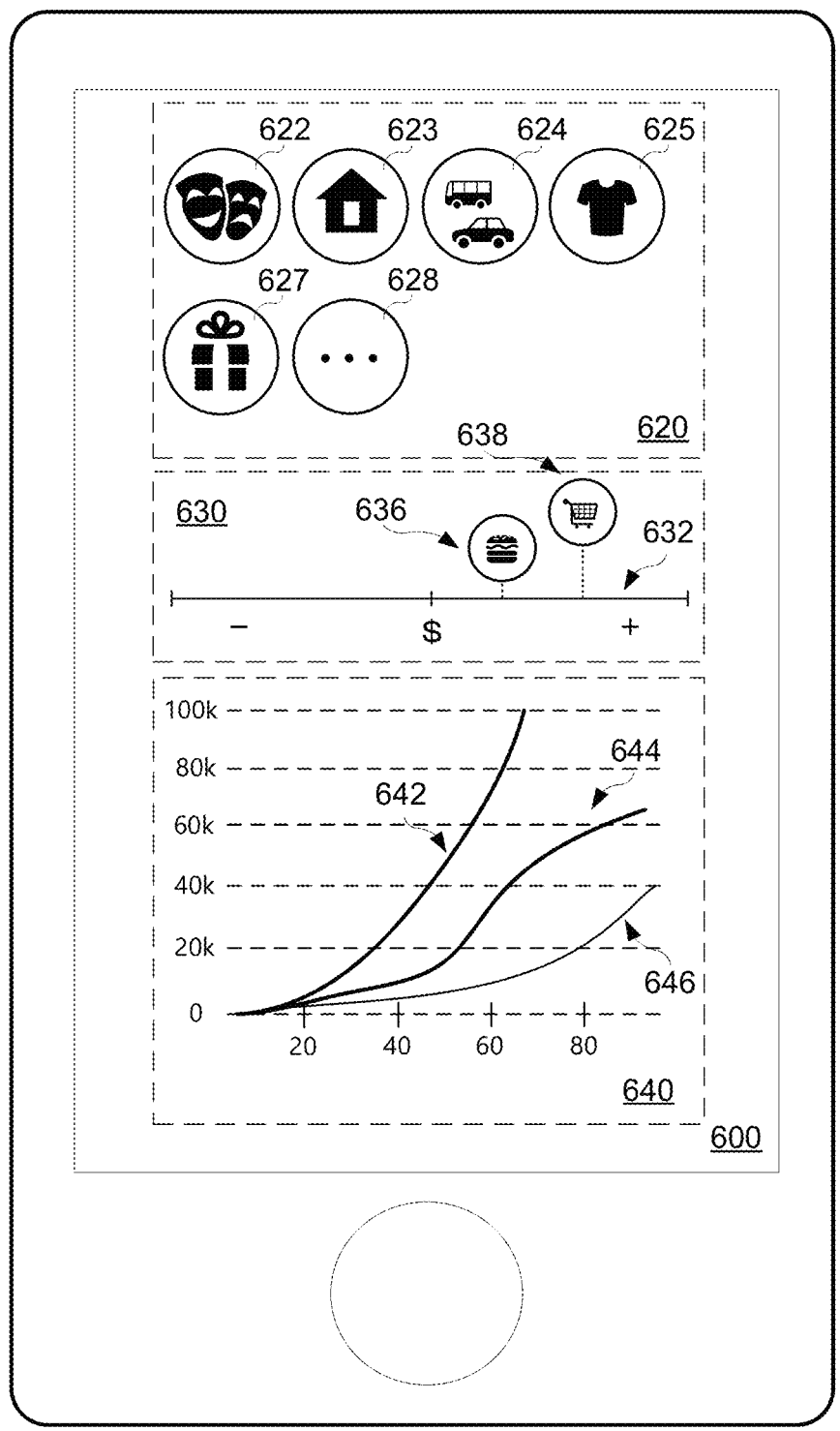

For example, turning to FIG. 6D, for example, a value has been assigned to an attribute associated with icon 626—i.e. the grocery spending category. As such, an indicator 638 is now displayed reflecting that value. In particular, as indicated by the indicator 638 and, more particular, the position of the indicator 638 within the second region 630 and relative to the scale 632, a value has been assigned to the grocery spending category reflecting increased utility/increased spending in that category relative to historical spending in that category.

The position of the third line 646 has also been updated relative to FIG. 6C to reflect a lower achievable financial benefit due to the indicated increase in grocery spending.

In manners described above, the user interface control can be used in the user interface 600 to assign values to reflect spending in many categories without the need to have a single user interface control (e.g. a textbox or slider bar) associated with each category. Conveniently, in this way less screen real estate may be consumed. For example, it may be that if conventional user interface controls are employed, then graph 640 would not fit on the display 110 along with the other elements of the user interface 600. Additionally or alternatively, by employing the user interface control it may be that the need for scrolling may be reduced or limited Eliminating or reducing the need for scrolling may increase user satisfaction with a user interface and/or may improve accessibility of an interface such as to users identifying with disability.

In some embodiments, updated spending data may be received in real-time or near real-time for the user. For example, spending data may be "pushed" to the electronic device 100 as the user makes purchases, pays bills, etc. Additionally or alternatively, the electronic device 100 may request updated spending information periodically such as, for example, on a timer and/or in response to notifications of new spending. This new spending data may be used to update projections that were made based on historical spending data. For example, the graph 640 may be updated based on the updated spending information. For example, one or more of the first line 642, the second line 644 and the third line 646 may be updated to reflect the effects of the updated spending data. Conveniently, in this way, a user may visualize and understand the effects of their spending in real-time or near real-time such as by consulting the graph 640 as it updates after they spend such as, for example, by making a purchase.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer system comprising:
    a processor;
    a display coupled to the processor;
    an input interface coupled to the processor; and
    a memory coupled to the processor, storing instructions that, when executed by the processor, cause the computer system to:
        categorize historical data into a plurality of attributes and determine a historical average for each attribute;
        display, within a first region of the display, a plurality of icons, each icon corresponding to a particular one of the plurality of attributes;
        display a scale in a second region of the display, the scale having a midpoint that corresponds to the historical average for one of the particular attributes;
        receive, via the input interface, input corresponding to a drag-and-drop operation wherein a particular one of the plurality of icons is dragged to and then dropped at a drop position on the scale within the second region of the display;
        during the drag-and-drop operation, update values of the scale based on the particular one of the plurality of icons such that the midpoint of the scale corresponds to the historical average for the particular attribute that the particular one of the plurality of icons corresponds to; and
        assign a value to the particular attribute corresponding to the particular one of the plurality of icons based on a location of the drop position on the updated scale relative to the midpoint of the updated scale.

2. The computer system of claim 1 wherein the instructions further cause the computer system to:
    after assigning the value to the attribute, display an indication positioned relative to the scale indicating the value.

3. The computer system of claim 2, wherein the indication is smaller than the particular one of the plurality of icons.

4. The computer system of claim 2 wherein the instructions further cause the computer system to:
    receive, via the input interface, additional input corresponding to a further drag-and-drop operation wherein the indication is dragged to and then dropped at a further drop position on the scale within the second region; and,
    update the value assigned to the attribute based on a location of the further drop position on the scale.

5. The computer system of claim 1 wherein the instructions further cause the computer system to:
    upon assigning the value to the attribute, trigger an update to the display.

6. The computer system of claim 5 wherein the instructions further cause the computer system to:
    during the drag-and-drop operation, provide a preview of the update to the display.

7. A computer-implemented method comprising:
    categorizing historical data into a plurality of attributes and determining a historical average for each attribute;
    displaying, within a first region of a display, a plurality of icons, each icon corresponding to a particular one of the plurality of attributes;
    displaying a scale in a second region of the display, the scale having a midpoint that corresponds to the historical average for one of the particular attributes;
    receiving, via an input interface, input corresponding to a drag-and-drop operation wherein a particular one of the plurality of icons is dragged to and then dropped at a drop position on the scale within the second region of the display;
    during the drag-and-drop operation, updating values of the scale based on the particular one of the plurality of icons such that the midpoint of the scale corresponds to the historical average for the particular attribute that the particular one of the plurality of icons corresponds to;
    assigning a value to the particular attribute corresponding to the particular one of the plurality of icons based on a location of the drop position on the updated scale relative to the midpoint of the updated scale.

8. The computer-implemented method of claim 7 further comprising:
    after assigning the value to the attribute, displaying an indication positioned relative to the scale indicating the value.

9. The computer-implemented method of claim 8, wherein the indication is smaller than the particular one of the plurality of icons.

10. The computer-implemented method of claim 8 further comprising:
    receiving, via the input interface, additional input corresponding to a further drag-and-drop operation wherein the indication is dragged to and then dropped at a further drop position on the scale within the second region; and,
    updating the value assigned to the attribute based on a location of the further drop position on the scale.

11. The computer-implemented method of claim 7 further comprising:
    upon assigning the value to the attribute, triggering an update to the display.

12. The computer-implemented method of claim 11 further comprising:
    during the drag-and-drop operation, providing a preview of the update to the display.

13. The computer-implemented method of claim 12 wherein the attribute corresponds to a display brightness or a display contrast.

14. The computer-implemented method of claim 7 wherein the icons indicate spending categories and correspond to attributes representing spending in the spending categories.

15. The computer-implemented method of claim 14 wherein the scale represents utility and wherein the value assigned to the attribute is based on the location of the drop position on the scale and represents a utility of spending in a particular one of the spending categories.

16. The computer-implemented method of claim 14 further comprising:
    displaying a graph comprising a line indicating an achievable financial benefit over time, wherein the line automatically adjusts as values are assigned to the attributes representing spending in the spending categories.

17. The computer-implemented method of claim 16 further comprising:
determining the achievable financial benefit over time based on the values assigned to the attributes and historical spending habits of a user in one or more of the spending categories.

18. The computer-implemented method of claim 17 further comprising:
displaying a second line in the graph indicating a projected financial benefit over time, the projection assuming the historical spending habits of the user continue unchanged.

19. The computer-implemented method of claim 16 further comprising:
displaying a second line in the graph indicating an optimal achievable financial benefit over time.

20. A non-transitory computer-readable storage medium storing instructions that when executed by a processor of a computer system cause the computer system to:
categorize historical data into a plurality of attributes and determine a historical average for each attribute;
display, within a first region of a display, a plurality of icons, each icon corresponding to a particular one of the plurality of attributes;
display a scale in a second region of the display, the scale having a midpoint that corresponds to the historical average for one of the particular attributes;
receive, via an input interface, input corresponding to a drag-and-drop operation wherein a particular one of the plurality of icons is dragged to and then dropped at a drop position on the scale within the second region of the display;
during the drag-and-drop operation, update values of the scale based on the particular one of the plurality of icons such that the midpoint of the scale corresponds to the historical average for the particular attribute that the particular one of the plurality of icons corresponds to; and
assign a value to the particular attribute corresponding to the particular one of the plurality of icons based on a location of the drop position on the updated scale relative to the midpoint of the updated scale.

\* \* \* \* \*